(12) United States Patent
Hsieh

(10) Patent No.: US 9,896,151 B1
(45) Date of Patent: Feb. 20, 2018

(54) BICYCLE PEDAL

(71) Applicant: Chin-Long Hsieh, Taichung (TW)

(72) Inventor: Chin-Long Hsieh, Taichung (TW)

( * ) Notice: Subject to any disclaimer, the term of this patent is extended or adjusted under 35 U.S.C. 154(b) by 0 days.

(21) Appl. No.: 15/249,427

(22) Filed: Aug. 28, 2016

(30) Foreign Application Priority Data

Aug. 16, 2016 (TW) .............................. 105126136 A

(51) Int. Cl.
*B62M 3/08* (2006.01)
(52) U.S. Cl.
CPC ..................................... *B62M 3/08* (2013.01)
(58) Field of Classification Search
CPC ................................. B62M 3/08; B62M 3/12
See application file for complete search history.

(56) References Cited

U.S. PATENT DOCUMENTS

| | | | | |
|---|---|---|---|---|
| 4,838,115 A * | 6/1989 | Nagano | ..................... | B62M 3/08 74/594.4 |
| 8,225,635 B2 * | 7/2012 | Wang | ..................... | B23P 15/00 72/37 |
| 8,516,922 B2 * | 8/2013 | Curran | ..................... | B62M 3/08 74/594.1 |
| 9,593,993 B1 * | 3/2017 | Chen | ..................... | G01L 5/225 |
| 9,663,185 B2 * | 5/2017 | Chen | ..................... | B62M 3/08 |
| 2005/0028639 A1 * | 2/2005 | Chang | ..................... | B62J 6/00 74/594.4 |
| 2012/0048060 A1 * | 3/2012 | Arnold | ..................... | B62M 3/08 74/594.4 |
| 2015/0298762 A1 * | 10/2015 | Lin | ..................... | B62M 3/08 74/594.4 |

FOREIGN PATENT DOCUMENTS

| | | | | |
|---|---|---|---|---|
| DE | 858940 C | * | 12/1952 | ............. B62M 3/08 |
| FR | 771273 A | * | 10/1934 | ............. B62M 3/08 |
| FR | 1109172 A | * | 1/1956 | ............. B62M 3/08 |
| FR | 2661651 A1 | * | 11/1991 | ............. B62M 3/08 |
| GB | 825258 A | * | 12/1959 | ............. B62M 3/08 |

* cited by examiner

*Primary Examiner* — Adam D Rogers

(57) ABSTRACT

A bicycle pedal contains: a body, a plurality of self-lubricating bearings, a connection shaft, a tapered sleeve, and a threaded sleeve. The body includes a through hole configured to accommodate the connection shaft. The connection shaft includes a first taper section and a first screwing section fitting with the tapered sleeve and the threaded sleeve. A second taper section of the tapered sleeve mates with the first tapered section of the connection shaft, the threaded sleeve includes a second screwing section screwing with the first screwing section of the connection shaft, and the threaded sleeve pushes the tapered sleeve. The body of fixed size cooperates with the tapered sleeve of fixed size, multiple connection shafts of various sizes, and multiple threaded sleeves of various sizes so as to adjust a span of the bicycle pedal, and the connection shaft is in connection with the body.

4 Claims, 9 Drawing Sheets

BICYCLE PEDAL

FIELD OF THE INVENTION

The present invention relates to a bicycle pedal which is assembled easily and randomly.

BACKGROUND OF THE INVENTION

A conventional bicycle pedal is coupled with a connection shaft, wherein the connection shaft does not pass through the bicycle pedal and is locked with a crank, hence two planes are arranged on a large-diameter position of the connection shaft, and the two planes are rotated by a hand tool to lock with a crank.

However, the large-diameter position of the connection shaft is adjacent to the crank, so an operation space to the hand tool is narrow. Furthermore, a span between two bicycle pedals is fixed and cannot be adjusted based on using requirements.

The present invention has arisen to mitigate and/or obviate the afore-described disadvantages.

SUMMARY OF THE INVENTION

The primary objective of the present invention is to provide a bicycle pedal which is assembled easily and randomly.

To obtain above-mentioned objective, a bicycle pedal provided by the present invention contains: a body, a plurality of self-lubricating bearings, a connection shaft, a tapered sleeve, and a threaded sleeve.

The body includes a through hole passing through the body so as to accommodate a connection shaft.

The connection shaft includes a first taper section and a first screwing section which are formed on a first end of the connection shaft so as to fit with a tapered sleeve and a threaded sleeve.

A second taper section of the tapered sleeve mates with the first tapered section of the connection shaft.

The threaded sleeve includes a second screwing section arranged on an inner wall thereof so as to screw with the first screwing section of the connection shaft, and the threaded sleeve pushing the tapered sleeve.

The body of fixed size cooperates with the tapered sleeve of fixed size, multiple connection shafts of various sizes, and multiple threaded sleeves of various sizes so as to adjust a span of the bicycle pedal, and the connection shaft is in connection with the body, hence degree of freedom of the body is maintained, and the body is not locked.

When the tapered sleeve reaches a locking point, it faces to a first side face of the body and keeps a gap from an adjacent face of the body, such that the body is not locked by way of the gap, the body keeps its degree of freedom, a freed end of the body is coupled with an orifice of the connection shaft, and the connection shaft is locked with a crank of a bicycle.

DETAILED DESCRIPTION OF THE PREFERRED EMBODIMENTS

Figure 1:
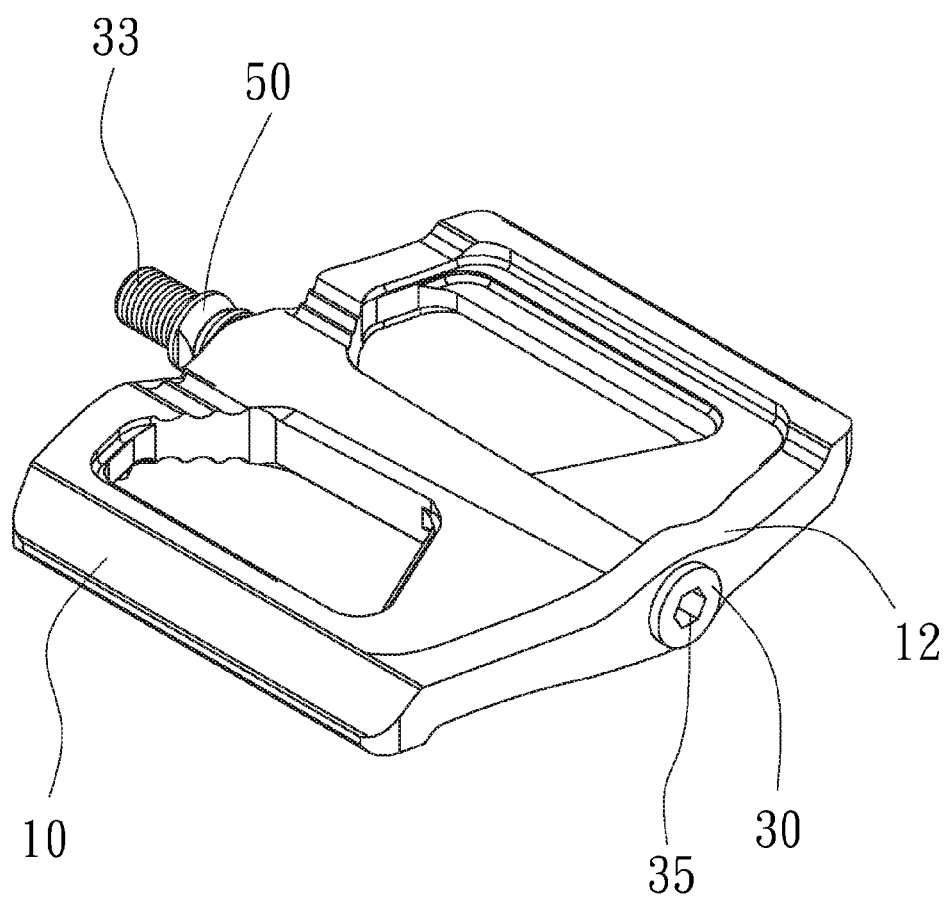
FIG. 1 is a perspective view showing the assembly of a bicycle pedal according to a first embodiment of the present invention.
Figure 2:
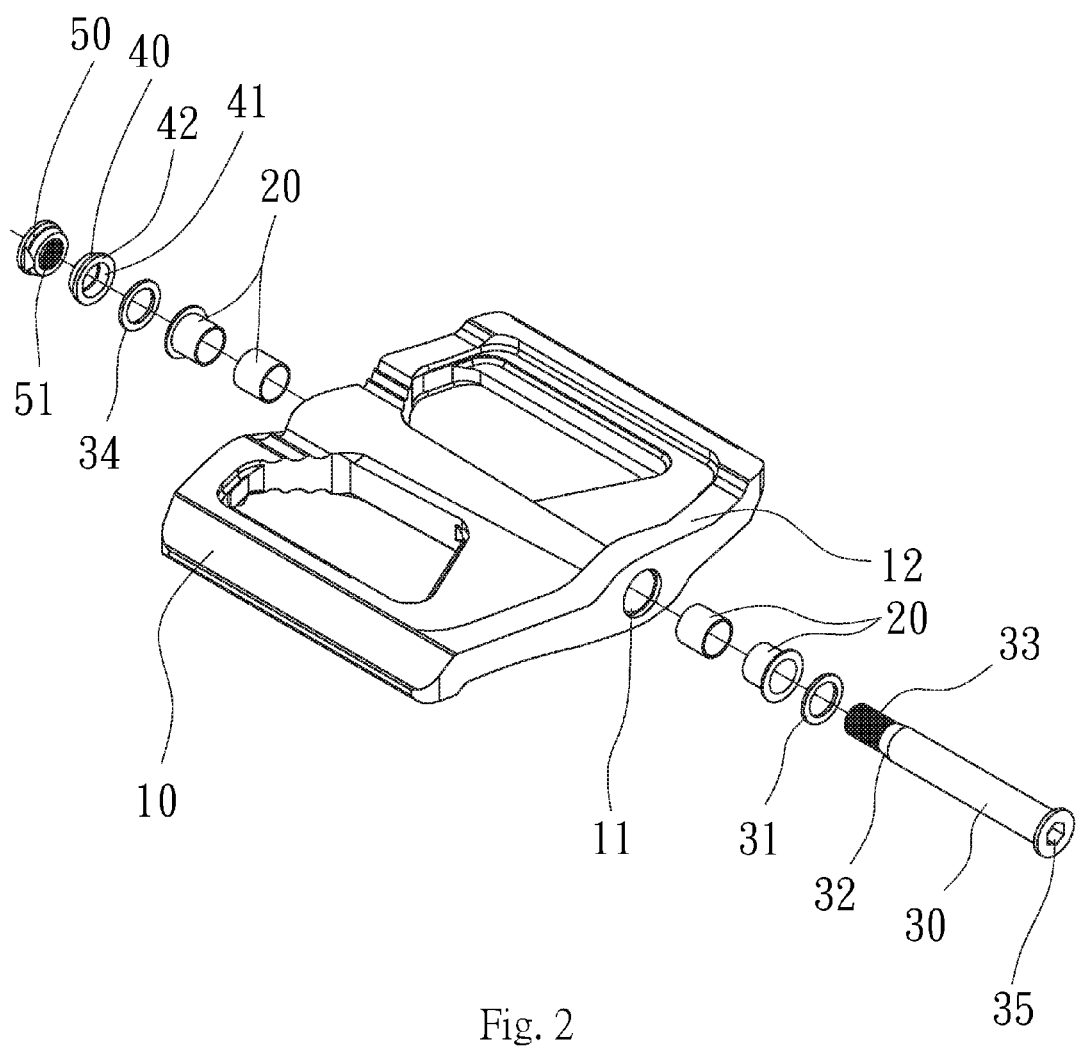
FIG. 2 is a perspective view showing the exploded components of the bicycle pedal according to the first embodiment of the present invention.

With reference to FIGS. 1-3D, 5, and 7, a bicycle pedal according to a first embodiment of the present invention comprises: a body 10, a plurality of self-lubricating bearings 20, a connection shaft 30, a tapered sleeve 40, and a threaded sleeve 50.

The body 10 includes a through hole 11 passing through the body 10 so as to accommodate the plurality of self-lubricating bearings 20, a first washer 31, a second washer 34, and the connection shaft 30.

The connection shaft 30 includes a first tapered section 32 and a screwing section 33 which are formed on an end of the connection shaft 30 so as to fit with the second washer 34, the tapered sleeve 40, and the threaded sleeve 50.

An inner tapered portion 41 of the tapered sleeve 40 axially engages with the tapered section 32 of the connection shaft 30.

The threaded sleeve 50 includes an inner thread 51 arranged on an inner wall thereof so as to screw with the screwing section 33 of the connection shaft 30, wherein the threaded sleeve 50 pushes the tapered sleeve 40.

Thereby, the body 10 of fixed size cooperates with the tapered sleeve 40 of fixed size, multiple connection shafts 30 of various sizes, and multiple threaded sleeves 50 of various sizes so as to adjust a span of the bicycle pedal (as shown in FIGS. 3A to 3D), and the connection shaft 30 is in connection with the body 10, hence degree of freedom of the body 10 is maintained, and the body 10 is not locked.

Figure 5:
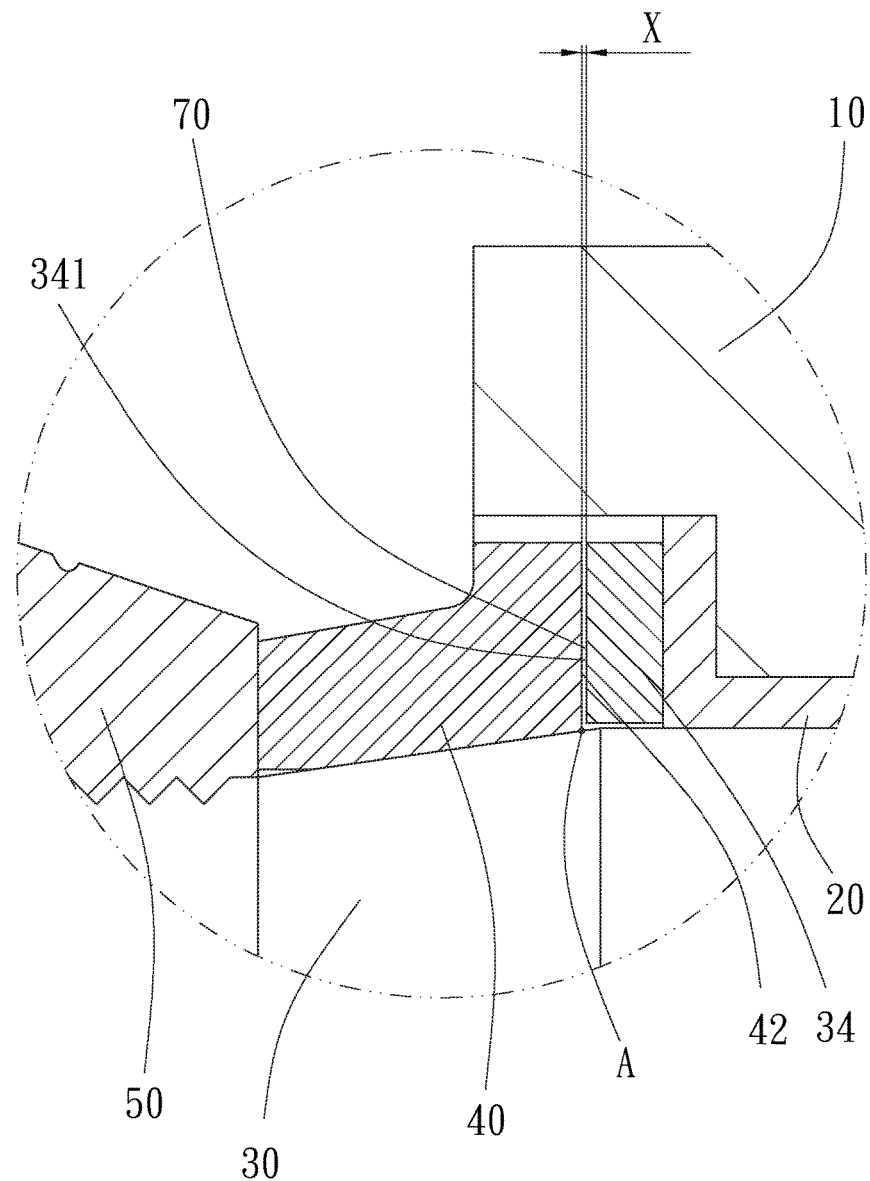
FIG. 5 is an amplified cross sectional view of a part of FIG. 3A.
Figure 7:
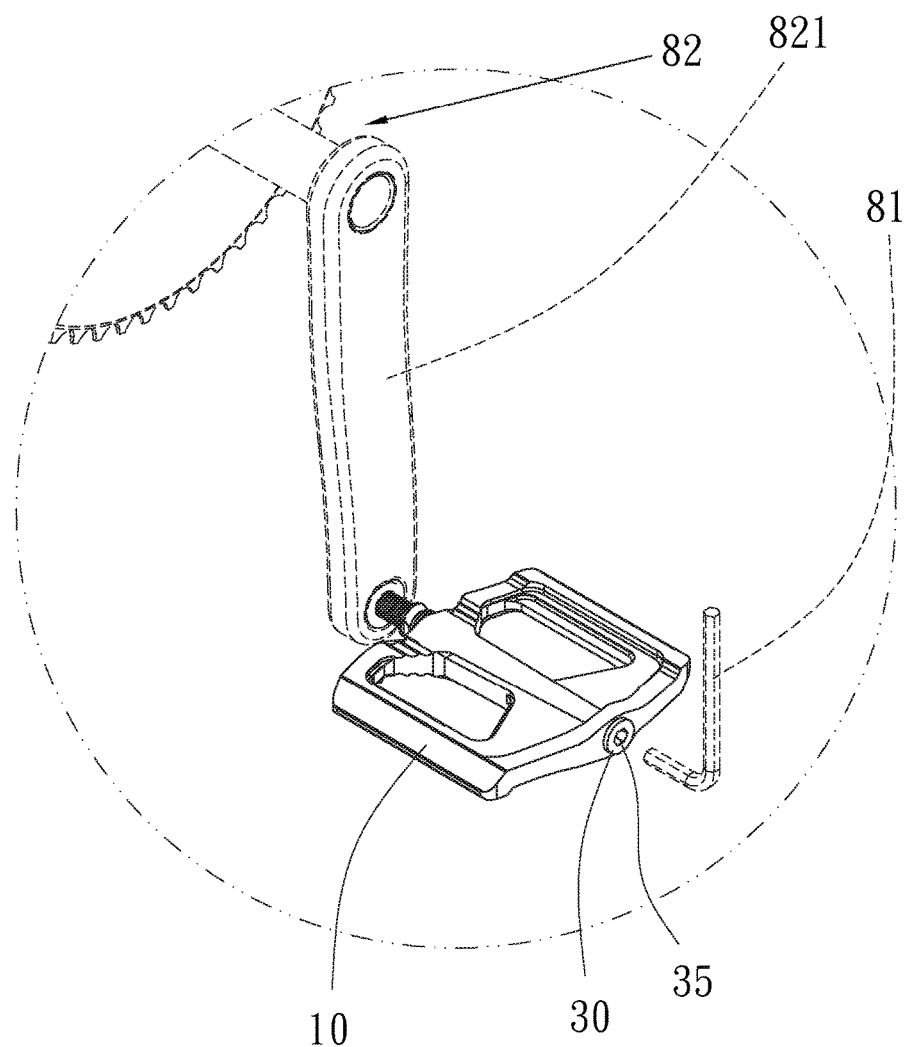
FIG. 7 is a perspective view showing the application of the bicycle pedal according to the present invention.

In operation, when the tapered sleeve 40 reaches a locking point A, it faces to a first side face 42 of the body 10 and keeps a gap X from an adjacent face 70 of the body 10, such that the body 10 is not locked by way of the gap X, and the body 10 keeps its degree of freedom, as illustrated in FIG. 5. An orifice 35 is formed in the other end of the connection shaft 30, the connection shaft 30 is locked with a crank 821 of a bicycle 82, and a space beside the free end 12 of the body 10 is wide so that a hand tool 81 operates easily and randomly, as shown in FIG. 7.

Between the body 10 and the tapered sleeve 40 is defined the second washer 34, and the adjacent face 70 is a second side face 341 of the second washer 34.

The adjacent face 70 is a peripheral face of each of the plurality of self-lubricating bearings 20.

Referring to FIGS. 3A to 3D, the multiple connection shafts 30 of the various sizes includes a short connection shaft, a medium connection shaft, a long connection shaft, and a longest connection shaft, wherein the body 10 and the tapered sleeve 40 are in a fixed size.

Figure 3A:
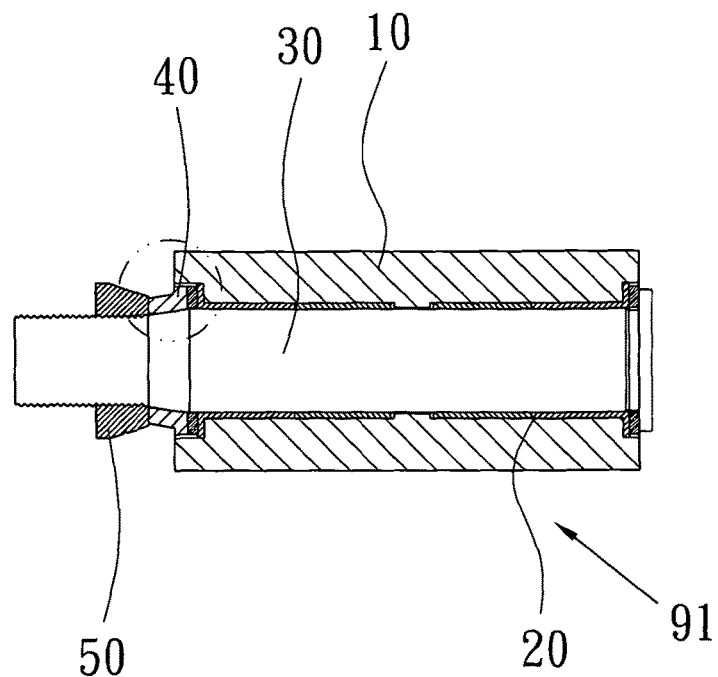
FIG. 3A to 3D are a cross sectional view showing the operation of the bicycle pedal according to the first embodiment of the present invention.
Figure 3B:
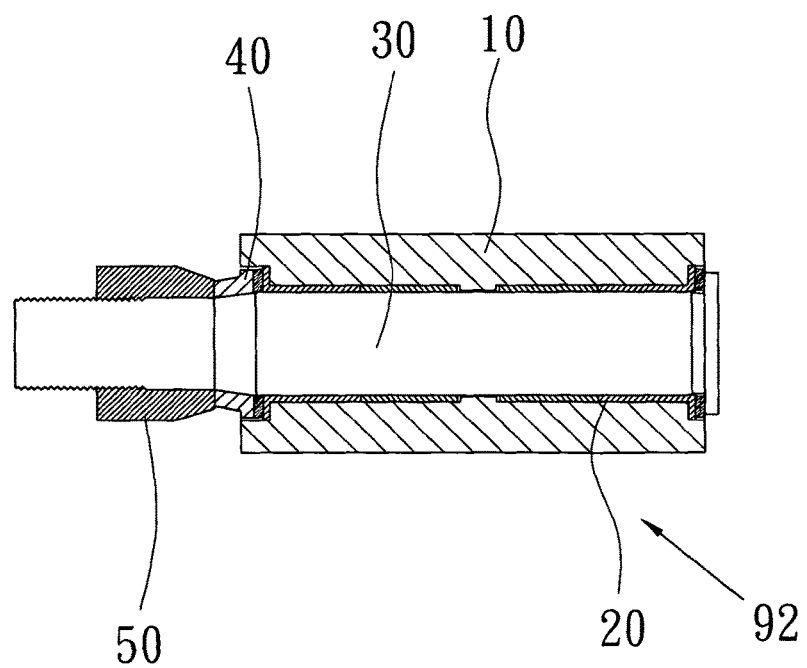
Figure 3C:
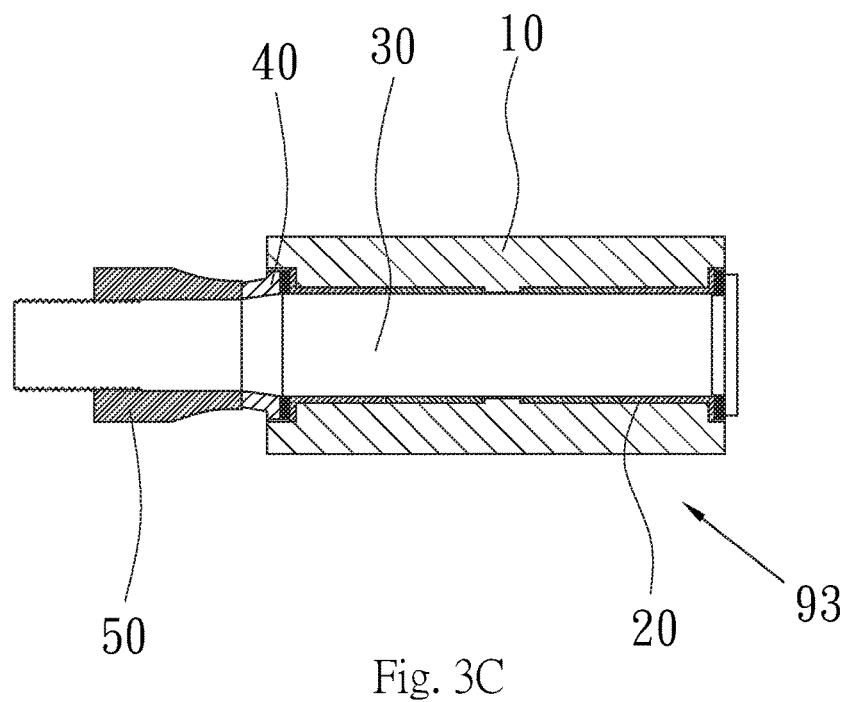
Figure 3D:
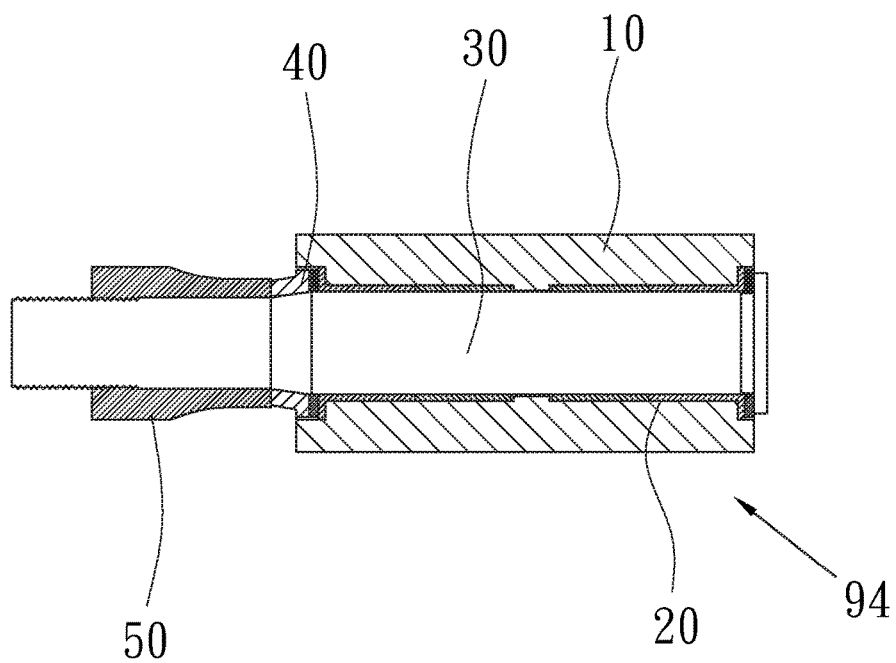

The multiple threaded sleeves 50 of the various sizes includes a short threaded sleeve, a medium threaded sleeve, a long threaded sleeve, and a longest threaded sleeve, wherein the threaded sleeve 50 is connected with a short-span body 91, as shown in FIG. 3A. The threaded sleeve 50 is connected with a medium-span body 92, as illustrated in FIG. 3B. The threaded sleeve 50 is coupled with a long-span body 93, as shown in FIG. 3C. The threaded sleeve 50 is coupled with a longest-span body 94, as shown in FIG. 3D.

With reference to FIGS. 1-4D, 6, and 7, a bicycle pedal for according to a second embodiment of the present invention comprises: a body 10, a plurality of self-lubricating bearings 20, a connection shaft 30, a tapered sleeve 40, a threaded sleeve 50, and an adjustment sleeve 60.

The body 10 includes a through hole 11 passing through the body 10 so as to accommodate the plurality of self-lubricating bearings 20, a first washer 31, and the connection shaft 30.

The connection shaft 30 includes a taper section 32 and a screwing section 33 which are formed on a first end of the connection shaft 30, wherein a second washer 34, the adjustment sleeve 60, the tapered sleeve 40, and the threaded sleeve 50 are fitted with the first end of the connection shaft 30.

An inner tapered portion 41 of the tapered sleeve 40 axially engages with the tapered section 32 of the connection shaft 30.

The threaded sleeve 50 includes an inner thread 51 arranged on an inner wall thereof so as to screw with the screwing section 33 of the connection shaft 30, wherein the threaded sleeve 50 pushes the tapered sleeve 40.

Thereby, the body 10 of fixed size cooperates with the tapered sleeve 40 of fixed size, multiple connection shafts 30 of various sizes, multiple threaded sleeves 50 of various sizes, and multiple adjustment sleeves 60 of various sizes so as to adjust a span of the bicycle pedal (as shown in FIGS. 4A to 4D), and the connection shaft 30 is connected with the body 10, hence degree of freedom of the body 10 is maintained, and the body 10 not locked.

Figure 6:
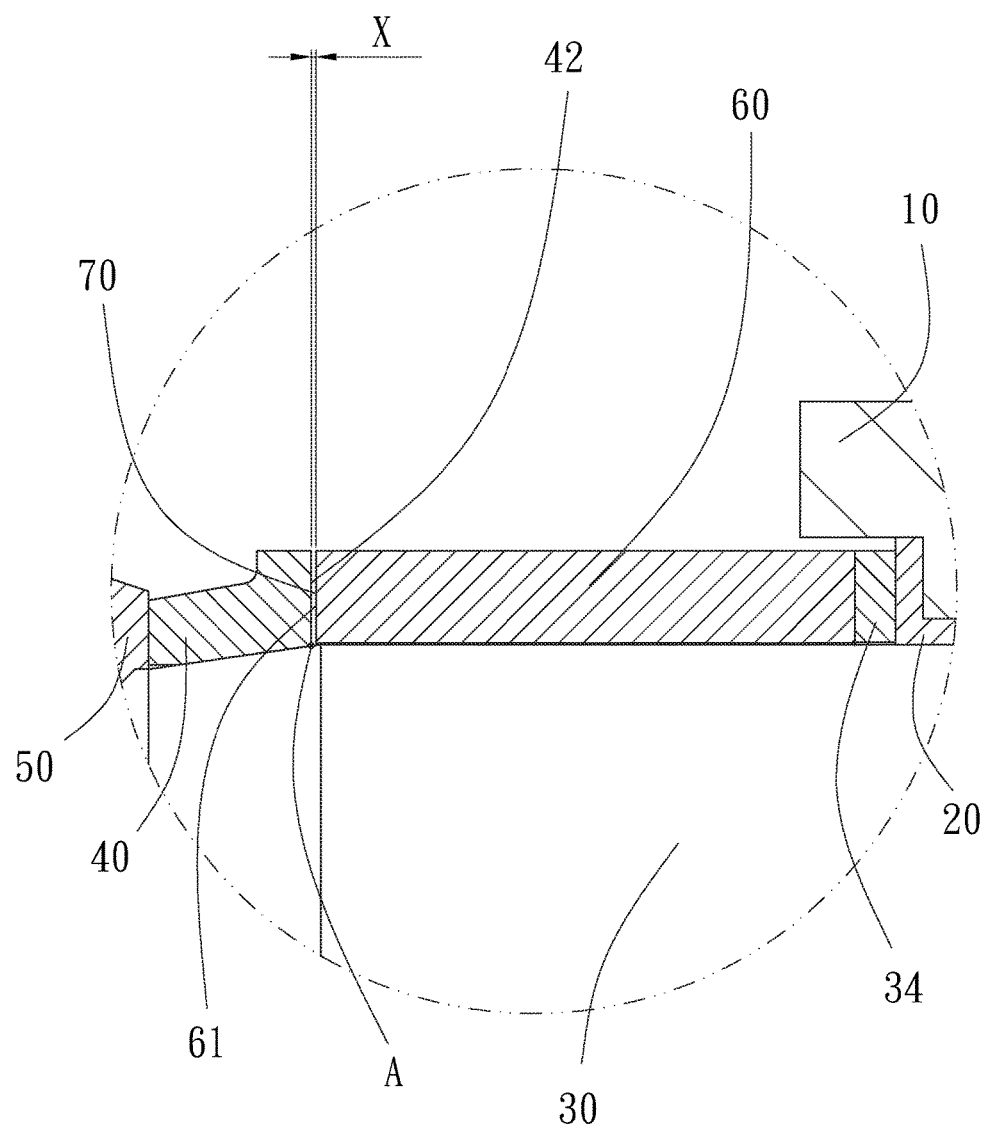
FIG. 6 is an amplified cross sectional view of a part of FIG. 4D.

In operation, when the tapered sleeve 40 reaches a locking point A, it faces to a first side face 42 of the body 10 and keeps a gap X from an adjacent face 70 of the body 10, such that the body 10 is not locked by way of the gap X, and the body 10 keeps its degree of freedom, as illustrated in FIG. 6. An orifice 35 is formed in the other end of the connection shaft 30, the connection shaft 30 is locked with a crank 821 of a bicycle 82, and a space beside the free end 12 of the body 10 is wide so that a hand tool 81 operates easily and randomly, as shown in FIG. 7.

A second washer 34 is located between the body 10 and the tapered sleeve 40, and the adjacent face 70 is a second side face 341 of the second washer 34.

The adjacent face 70 is a third side face 61 of each of the multiple adjustment sleeves 60.

Referring to FIGS. 4A to 4D, the multiple connection shafts 30 of the various sizes includes a short connection shaft, a medium connection shaft, a long connection shaft, and a longest connection shaft, wherein the body 10, the threaded sleeve 50, and the tapered sleeve 40 are in a fixed size.

Figure 4A:
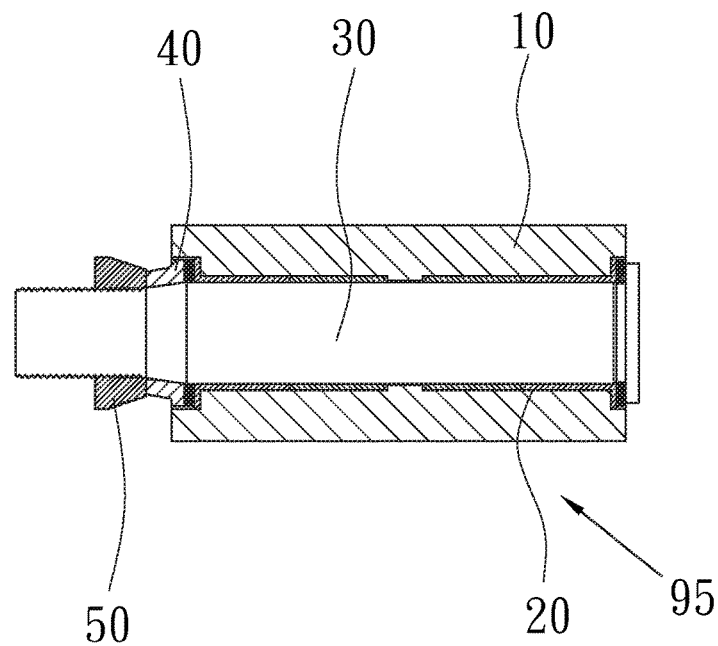
FIG. 4A to 4D are a cross sectional view showing the operation of the bicycle pedal according to a second embodiment of the present invention.
Figure 4B:
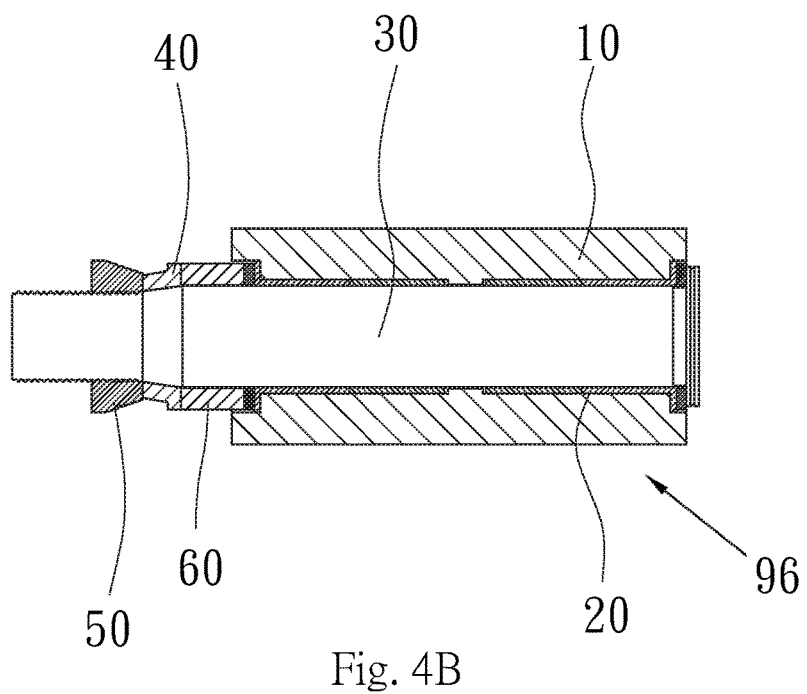
Figure 4C:
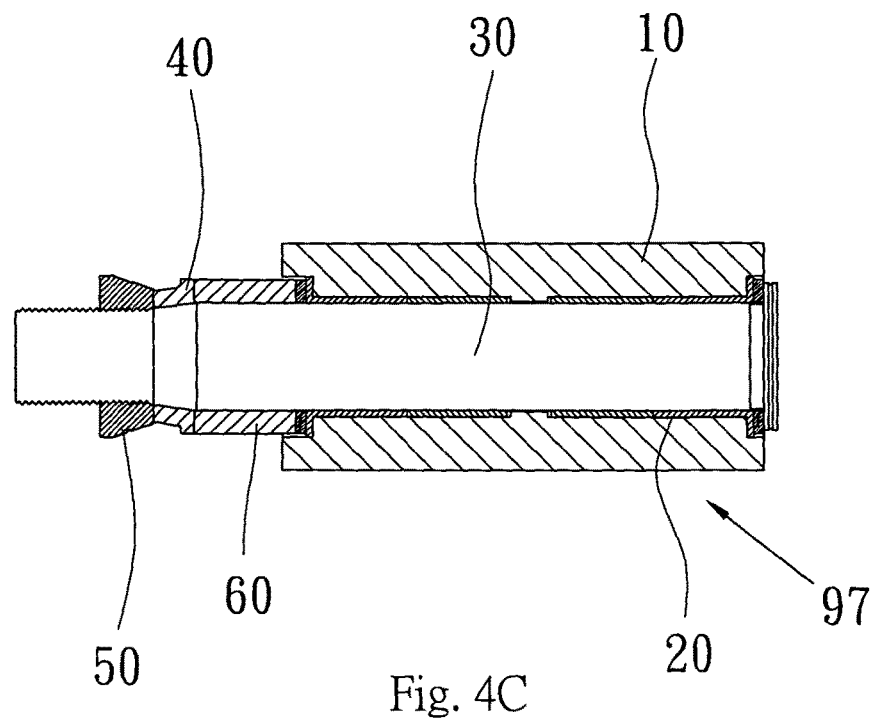
Figure 4D:
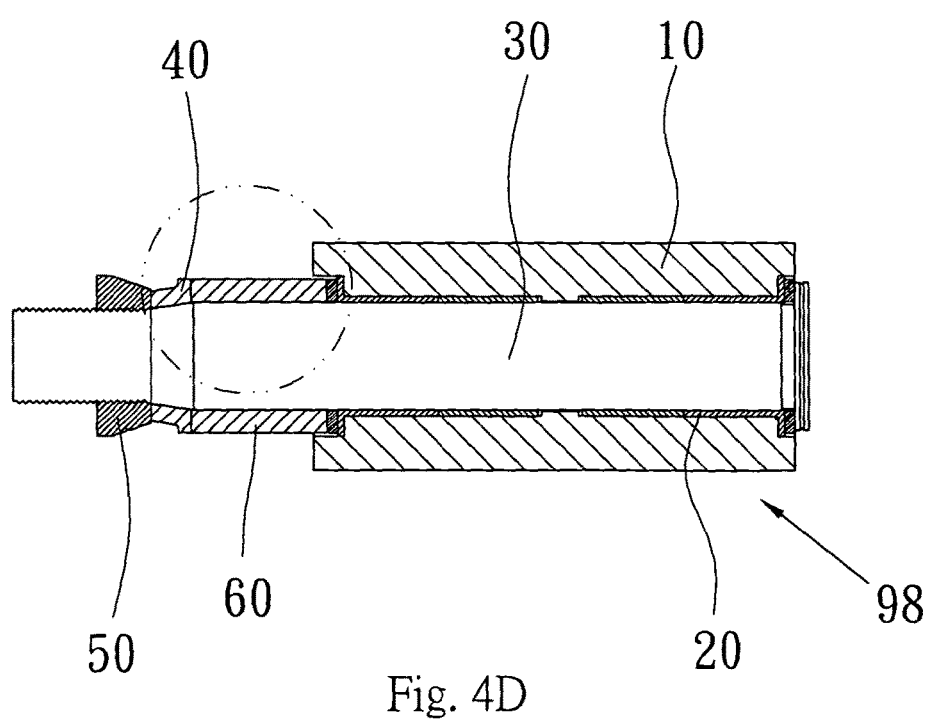

The multiple adjustment sleeves 60 of the various sizes includes a medium adjustment sleeve, a long adjustment sleeve, and a longest adjustment sleeve, wherein the adjustment sleeve 60 is not connected with a short-span body 95, as shown in FIG. 4A. The adjustment sleeve 60 is connected with a medium-span body 96, as shown in FIG. 4B. The adjustment sleeve 60 is in connection with a long-span body 97, as illustrated in FIG. 4C. The adjustment sleeve 60 is coupled with a longest-span body 98, as shown in FIG. 4D.

Accordingly, the span of the bicycle pedal is adjustment so as to maintain the degree of freedom of the body, and the body is not locked. Preferably, the space beside the free end of the body is wide so that the hand tool operates easily and randomly.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A bicycle pedal comprising:
   a body including a through hole;
   a connection shaft, axially received in the through hole, including a tapered section and a screwing section which are formed on an end of the connection shaft, and the screwing section protruding from of the body for connecting a crank;
   a washer around the connection shaft and directly adjacent the tapered section;
   a tapered sleeve, ringed around the connection shaft, abutting against the washer, and having an inner tapered portion axially engaging with the tapered section of the connection shaft; and
   a threaded sleeve, ringed around the connection shaft and outside the body, including an inner thread arranged on an inner wall thereof so as to screw with the screwing section of the connection shaft, and the threaded sleeve abutting against the tapered sleeve.

2. The bicycle pedal as claimed in claim 1, wherein the through hole also accommodates a plurality of self-lubricating bearings.

3. The bicycle pedal as claimed in claim 1, further comprising an adjustment sleeve sandwiched between the washer and the tapered sleeve.

4. The bicycle pedal as claimed in claim 1, wherein an orifice is formed in another end of the connection shaft.

* * * * *